United States Patent Office 3,552,871
Patented Jan. 5, 1971

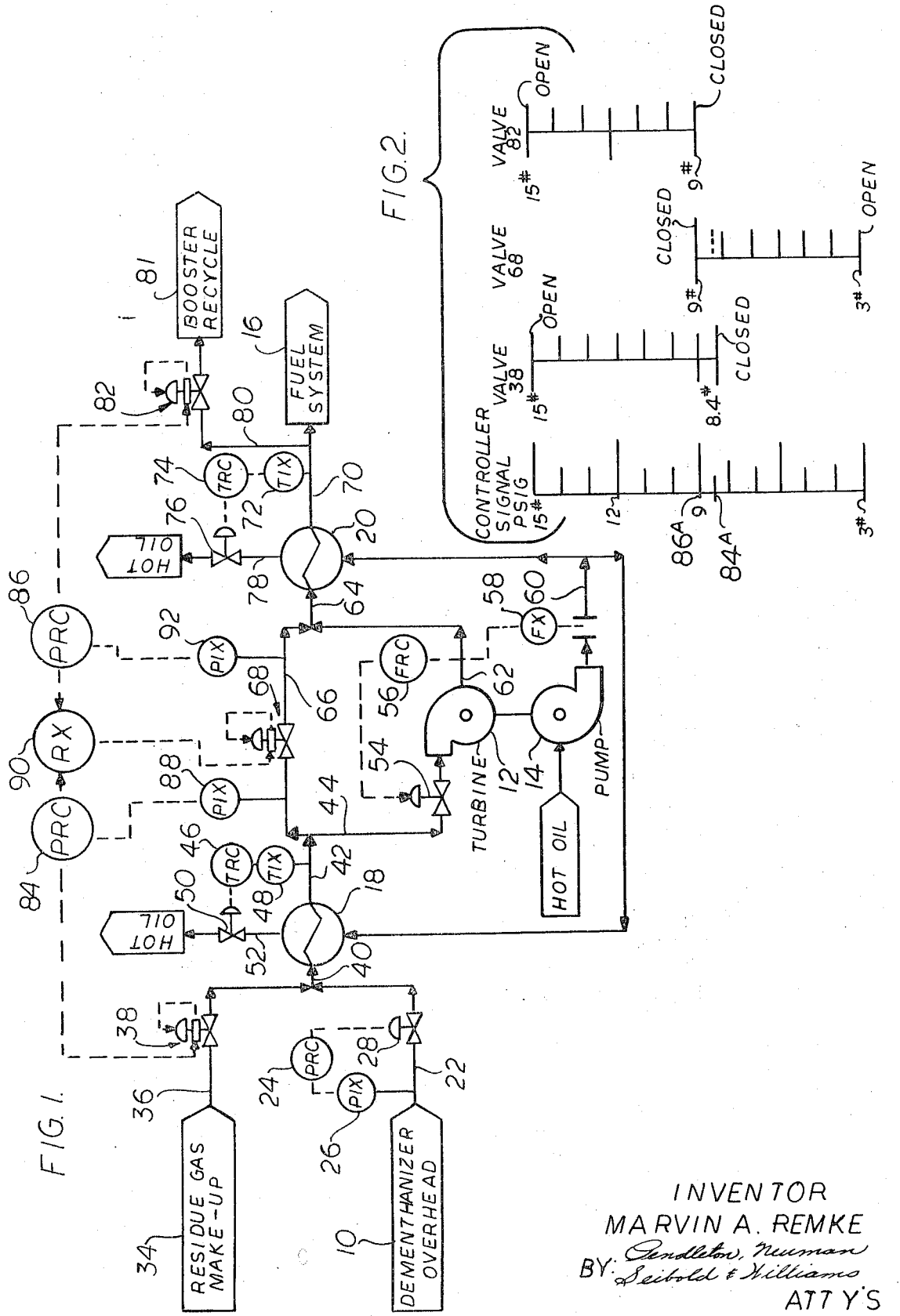

3,552,871
METHOD AND APPARATUS FOR A GAS SUPPLY CONTROL SYSTEM
Marvin A. Remke, Bartlesville, Okla., assignor to Phillips Petroleum Company, a corporation of Delaware
Filed Jan. 9, 1969, Ser. No. 790,056
Int. Cl. F01d *17/08*
U.S. Cl. 415—1
16 Claims

ABSTRACT OF THE DISCLOSURE

Fuel gas under pressure from a plant process source is used to drive a turbine, with the turbine exhaust gases supplying a plant fuel gas system. An auxiliary feed is also connected to the turbine inlet, and an excess fuel diversion conduit is connected to the turbine outlet to divert turbine exhaust gases in excess of the fuel system requirements. A turbine bypass connects the turbine inlet to the turbine outlet. An adjustable valve is provided in each of the auxiliary feed conduits, the turbine bypass and the exhaust divert conduit, with a turbine inlet pressure controller controlling the auxiliary feed valve, a turbine outlet pressure controller controlling the divert valve, and the two controllers selectively controlling the bypass valve to insure an adequate supply of fuel gas to the fuel system while maintaining the desired turbine power output.

---

This invention relates to apparatus for controlling fluid power to two systems connected in series with a variable fluid power source. More particularly, this invention pertains to a control system for utilizing fuel gas under pressure from an unregulated plant source and from a regulated auxiliary source to provide both the power requirements of a gas turbine and the fuel requirements of a fuel gas system.

In various instances, a fluid under pressure, such as a fuel gas, may be utilized to operate two independent energy consuming or power systems in series. An example is the extraction of power from a pressurized fuel gas by lowering its pressure through an expansion engine, followed by burning of the lower pressure engine exhaust gas for heating purposes. One such opportunity is available in a natural gas plant where the demethanizer overhead gas, which is under pressure, may be utilized to operate a turbine for power generation purposes, e.g., to drive a process pump, prior to consumption of the gas in a plant fuel system. However, this poses certain problems in that the output of the power system is relied upon as the input for the fuel system, and the requirements of either system may vary independently of the other. For instance, in the example given, the power output of the turbine should be controllable, normally remaining substantially constant, while the overhead supply to the turbine and/or the fuel system requirements may vary significantly. The turbine input requirement can be supplied by providing an auxiliary gas supply complementary to the overhead supply. However, this presents an additional input control requirement, whereby the system presents a dual source, dual destination requirement control problem.

It is an object of this invention to overcome the problems indicated above.

It is another object of this invention to provide an improved control arrangement for controlling the supply of fluid to two fluid utilization systems in series.

It is another object of this invention to provide an improved gas flow control system for independently controlling the flow of gas to two gas utilizing systems connected in series.

It is another object of this invention to provide an improved gas flow control system for providing independently regulated inputs to two gas systems connected in series with a dual source supply.

It is another object of this invention to provide an improved gas utilization system wherein an unregulated supply of pressurized fuel gas is used as the primary energy input for sequentially driving an expansion engine and supplying a fuel system, with independent control of the power output of the engine and of the supply to the fuel system.

Further and additional objects and advantages of this invention will appear from the description, accompanying drawings and appended claims.

In carrying out this invention in one illustrative form, an expansion engine and a fuel system are connected in series with an unregulated source of fuel gas under pressure, said engine being interposed between such source and said fuel system. A regulated auxiliary gas source also is connected to the engine inlet, and a diversion line line including a flow regulator is connected to the engine outlet. A bypass line including a flow regulator is connected between the inlet and the outlet of said engine. An engine inlet pressure controller controls the flow of gas from said auxiliary source, an engine outlet pressure controller controls said diversion flow regulator, and said controllers selectively control said bypass regulator to maintain an appropriate regulated supply of fuel gas to said fuel system while maintaining the desired turbine power output.

For a more complete understanding of the invention, reference should be had to the embodiment illustrated in the accompanying drawing and described below by way of example of the invention, wherein:

FIG. 1 comprises a diagrammatic representation of a fuel gas and turbine gas supply system embodying teachings of this invention, and FIG. 2 is a graphic illustration of the operation of the controls in the system of FIG. 1.

The system illustrated in FIG. 1 is designed to utilize the overhead output from a demethanizer (indicated generally at 10) in a natural gas plant to drive a gas turbine 12 for operating an amine kettle hot oil circulating pump 14 and to supply a plant fuel gas system indicated generally at 16. From the pump 14, the hot oil is directed through heat exhangers 18 and 20 for temperature control of the fuel gas, as will be referred to further below. The hot oil system may be a conventional system and is not otherwise described herein except as its influences the operation of the fuel gas system.

Referring more particularly to the fuel gas system, the demethanizer overhead comprises the main gas supply source. From this source 10 the gas is directed through a supply conduit 22 to the heat exchanger 18 and to the inlet of turbine 12 at a pressure determined by a pressure recorder controller 24 which receives a pressure indicating signal from pressure indicating transducer 26 and adjusts a regulator valve 28 accordingly. The volume rate of flow of gas supplied through line 22 is unregulated except as to the parameters of operation of the demethanizer, but is substantially constant at a rate normally slightly in excess of the normal requirements for operation of turbine 12.

A residue gas make-up 34 comprises an auxiliary source of fuel gas which also is connected to the heat exchanger, and thus to the turbine inlet, by a conduit 36. An adjustable control valve 38 in conduit 36 controls the auxiliary gas supply as described further below.

Conduits 22 and 36 are connected to inlet conduit 40 of heat exchanger 18, and the outlet conduit 42 is connected to the inlet conduit 44 leading to turbine 12. The temperature of the gas flowing to inlet conduit 44 is determined by a temperature recorder controller 46 which responds to a temperature indicating signal from a transducer 48 connected to conduit 42 to adjust a control valve 50 in the hot oil line 52.

The input to the turbine is controlled by an adjustable valve 54 to provide the desired flow rate through pump 14. To this end, valve 54 is positioned by a flow recorder controller 56 in response to a signal from a flow rate transducer 58 which indicates the flow rate in pump output conduit 60.

The turbine exhaust or outlet conduit 62 is connected to the inlet conduit 64 of heat exchanger 20.

A turbine bypass conduit 66 is connected to the turbine inlet line 44, at the outlet conduit 42 of heat exchanger 18, and also is connected to the turbine outlet conduit 62, at the inlet conduit 64 to heat exchanger 20. An adjustable valve 68 is provided in bypass conduit 66 for control purposes, to be described further below.

The outlet of heat exchanger 20 is connected by conduit 70 to a plant fuel system 16 which may be a conventional heater, furnace or burner unit or units which utilize the gas for process heating purposes. The temperature of the gas flowing from heat exchanger 20 is sensed by a temperature transducer 72 which provides a temperature indicating signal to a temperature recorder controller 74 which positions a control valve 76 in hot oil line 78.

A fuel gas diversion conduit 80 is connected to conduit 70 and leads to an auxiliary storage or usage system, such as a booster recycle system 81, through an adjustable valve 82.

The control system for the supply of gas to the turbine 12 and fuel system 16 comprises a pair of pressure recorder controllers 84 and 86 which control valves 38, 68 and 82 in accordance with the inlet and outlet pressures of the turbine 12. Controller 84 receives a signal from a pressure indicating transducer 88 indicative of the inlet pressure to the turbine and provides direct operating control of the auxiliary supply valve 38. Thus, controller 84 adjusts valve 38 appropriately toward maintenance of a predetermined pressure in the inlet line to the turbine as determined by the set-point of controller 84. This set-point is selected in accordance with the turbine power output requirement. Controller 84 also transmits its control signal output to a component 90 which controls the position of bypass valve 68.

Controller 86 receives a signal from a pressure indicating transducer 92 indicative of the outlet pressure (back pressure) of the turbine and provides direct operating control of the diversion control valve 82. Thus, controller 86 adjusts valve 82 appropriately toward maintenance of a predetermined pressure in the turbine outlet and fuel system supply conduit 70 as determined by the set-point of controller 86. This set-point is selected in accordance with the turbine power output (pressure-drop) and fuel system input pressure requirements. Controller 86 also transmits its control signal output to the control component 90.

Component 90 selects between the two input signals thereto from controllers 84 and 86, in accordance with the system output requirements, and transmits an appropriate positioning signal to the motor positioner of bypass valve 68. Generally, the control components are selected so that a signal to controller 90 from either of controllers 84 and 86 calling for opening of bypass valve 68 takes precedence over, or overrides a signal from the other controller calling for closing or less opening of the valve 68. By way of example, a "demand" signal from controller 84 which calls for opening of auxiliary supply valve 38 to increase the turbine inlet pressure will also provide a signal to controller 90 which calls for closing of bypass valve 68 to reduce bypass flow. A "demand" signal from controller 86 which calls for closing of diversion valve 82 to increase the turbine outlet (fuel system input) pressure will provide a signal to controller 90 which calls for opening of bypass valve 68 to increase bypass flow. Such an opening signal to controller 90 from controller 86 receives precedence over a closing signal from controller 84 whereby the flow through the turbine and through the bypass is always adequate to satisfy the requirements of the fuel system 16. Moreover, upon any such overriding of a closing signal for valve 68 from controller 84, any continuing or resulting lowered turbine inlet pressure will result in additional compensation by controller 84 by way of further opening of auxiliary supply valve 38 until the set-point inlet pressure is re-established. Thereby both the turbine power requirement and fuel gas system requirements will be met.

Conversely, if the main gas supply, turbine power requirements and fuel system requirements are such that valve 38 is closed and controller 84 provides a signal to controller 90 calling for opening of valve 68, the controller 90 will open valve 68 in preference to any closing signal from controller 86. The resulting increase in the turbine outlet pressure will cause controller 86 to begin to open diversion valve 82 to maintain the desired back pressure on the turbine. Thereby, the entire fuel gas supply from source 10 will continue to be passed through the system while maintaining the set-point parameters for the turbine power output and the fuel system.

By providing appropriate levels of control signals, and valve motor responses, the controller 90 may be a simple low-select or high-select relay for selecting the preferential signal and relaying same to the positioning motor of valve 68.

It will be appreciated that various control apparatus, such as fully pneumatic apparatus, fully electrical apparatus or combination electrical-pneumatic apparatus may be utilized in the described system. Also, various flow restricting devices may be utilized. However, a preferred system of pneumatic controls and diaphragm motor operated valves will be described by way of a more detailed illustration of a particular system employing this invention. It will be assumed that an instrument air system (not shown) of at least 15 p.s.i.g. is appropriately connected to the various components. It will also be assumed that the system is designed to operate the turbine at a constant inlet pressure of 372 p.s.i.g. with an outlet pressure of 72 p.s.i.g., and that the normal demethanizer overhead volume will supply the gas requirement for operation of the turbine plus approximately 10% excess.

In the aforedescribed system, the control function may be carried out using three adjustable diaphragm motor control valves 38, 68 and 82 set for split range positioning as shown in FIG. 2. Valve 38 is normally closed and has a direct action positioner control, opening under increasing pressure in its operating range as illustrated. Valve 68 is normally open and has a direct action positioner control, closing under increasing pressure in its operating range as illustrated. Value 82 is normally open and has a reverse action positioner control, closing under decreasing pressure in its operating range as illustrated. Controller 84 provides a signal inversely proportional to the turbine inlet pressure, and controller 86 provides a signal directly proportional to the outlet pressure. With these components, a low select relay is utilized for controller 90.

The signal level designated 84a in FIG. 2 represents an 8.4# pneumatic signal from controller 84 at its 372 p.s.i.g. control point, and 86a represents a 9.0# signal from controller 86 at its 72 p.s.i.g. control point. Considering this illustration it will be noted that at an output of 8.4# from controller 84, valve 38 is closed and valve 68 is partially open to pass the 10% excess gas. If the turbine inlet pressure decreases below 372 p.s.i.g., the output of controller 84 increases providing controlled opening of auxiliary supply valve 38. Between outputs of 8.4# and 9.0#, bypass valve 68 is also under control of controller 84, moving to its closed position at 9.0#, provided controller 86 is not controlling by an overriding lower signal to low-select relay 90. Conversely, if the inlet pressure increases over 372 p.s.i.g., the output signal from controller 84 decreases and valve 38 remains closed, while bypass valve 68 is opened further under control of controller 84.

Considering controller 86, at the control point of 9.0# valve 82 is closed. If the turbine outlet pressure (fuel system inlet pressure) decreases, the output signal of controller 86 decreases whereby valve 82 remains closed and controller 86 provides controlled opening of valve 68. Conversely, if the turbine outlet pressure increases, the signal from controller 86 increases and valve 68 is closed thereby, unless under control by controller 84, and valve 82 is opened under control of the controller 86.

Considering further two extreme operational supply and demand variations from the initially assumed conditions, as the demethanizer volume decreases the turbine inlet pressure will decrease causing the air signal output from controller 84 to increase. This reaction wil begin to open valve 38 and attempt to simultaneously close bypass valve 68. However, the turbine outlet pressure will begin to decrease when valve 68 begins to close and the signal output from controller 86 will decrease and assume control of valve 68 through the low select relay 90. Thus controller 86 will react to maintain the required fuel volume while controller 84 will react to make up the demethanizer deficiency.

If the fuel gas requirement decreases while the demethanized is functioning normally the turbine outlet pressure will begin to increase. This increase in pressure will result in an increased pneumatic signal from the turbine outlet pressure controller 86 which cannot affect the position of bypass valve 68 because of the action of the low select relay 90 but it will cause the divert valve 82 to open to divert the amount of gas necessary for proper control of the turbine outlet pressure. The operation of the control system thus demonstrated by extreme conditions provides assurance that all intermediate control situations will be adequately handled. The system furthermore provides sufficient flexibility to make the various adjustments necessary should the assumed pressure-volume conditions need correction.

Further processing equipment of course may be included in the illustrated fuel gas system as required for appropriate treatment of the gas.

While the invention has been described with reference to the operation of a turbine and fuel system by demethanizer overhead in a natural gas plant, it will be appreciated that it also finds application in other areas, for instance in a helium plant, an ethylene plant or a field natural gas plane operation.

It will be appreciated that an improved system and method have been provided which meet the aforestated objects.

While particular embodiments of this invention have been shown, it will be understood, of course, that the invention is not limited thereto since modifications may be made by those skilled in the art, particularly in light of the foregoing teachings. Therefore, it is contemplated by the appended claims to cover any such modifications as incorporate those features which may be said to constitute the essential features of these improvements within the true spirit and scope of the invention.

I claim:

1. Apparatus for independently regulating the rate of supply of a fluid from a supply means to each of two fluid systems connected in series for use of the fluid output from a first of said systems as an input for a second of of said systems comprising a fluid bypass connected in parallel with said first system and in series with said supply means and said second system, means for adjusting the supply of fluid from said supply means to said first system and to said bypass to maintain a regulated fluid supply to said first system, adjustable flow restricting means in said bypass, and first control means for adjusting said adjustable flow restricting means to provide a bypass flow complementing the fluid output from said first system for maintaining a required fluid supply to said second system.

2. Apparatus as in claim 1 wherein said fluid supply means includes a first supply and a make-up supply, said means for adjusting the flow from said supply means to said first system and to said bypass comprising means for regulating said make-up supply.

3. Apparatus as in claim 2 including fluid diversion means connected in parallel with said second system and in series with said first system and said bypass, and adjustable flow restricting means in said diversion means.

4. Apparatus as in claim 2 including second control means for adjusting said adjustable flow restricting means in response to the supply of fluid to said first system, and wherein a signal from either of said first and second control means for opening of said adjustable flow restricting means is operative in preference to another signal from the other of said control means.

5. Apparatus for independently regulating the supply of a gas under pressure from a supply means to an expansion engine and to a gas system utilizing the gas output from said engine as an input, comprising bypass conduit means connected between the inlet of said engine and the inlet of said system, means for adjusting the supply of gas to the inlet of said engine to maintain a regulated supply of gas thereto, adjustable flow restricting means in said bypass means, and control means for adjusting said flow restricting means to provide bypass flow complementing the output of said engine for providing a regulated gas supply to said system.

6. Apparatus as in claim 5 including a main gas supply and a make-up supply connected to the inlet of said turbine, said means for adjusting the flow from said supply means to said inlet of said engine comprising means for regulating said make-up supply.

7. Apparatus as in claim 6 including control means for adjusting said adjustable flow restricting means in response to the supply of gas to said engine, and means for rendering a signal from either of said control means for opening of said adjustable flow restricting means operative in preference to another signal from the other of said control means.

8. Apparatus as in claim 6 including diversion conduit means connected to said inlet to said system, and adjustable flow restricting means in said diversion conduit means.

9. Apparatus for independently regulating the supply of a fuel gas under pressure from a first gas supply and a second gas supply to an expansion engine and to a fuel gas system utilizing the gas output from said engine as an input, comprising adjustable flow restricting means in said second supply, bypass conduit means connected between the inlet of said engine and the inlet of said system, adjustable flow restricting means in said bypass conduit means, control means for adjusting said second supply flow restricting means and said bypass flow restricting means for providing a regulated gas supply to the inlet of said engine, diversion conduit means connected to said inlet to said system, adjustable flow restricting means in said diversion conduit means, and further control means for adjusting said diversion flow restricting means and said bypass flow restricting means to provide a regulated gas supply to said inlet of said system, and means for rendering a signal from either of said control means for opening of said bypass flow restricting means operative in preference to another signal from the other of said control means, whereby said first gas supply is continuously utilized and a regulated supply is provided for said engine and for said system.

10. Apparatus as in claim 9 wherein said flow restricting means have adjustment responses whereby said diversion flow restricting means and said bypass flow restricting means are closed at the same predetermined control signal level, said diversion flow restricting means opening upon change of the control signal thereto in one direction from such predetermined level, said bypass flow restricting means opening upon change of the control signal thereto in the opposite direction from such predetermined level, and wherein the adjustment control range of said second supply flow restricting means overlaps the adjustment control range of said bypass flow restricting means, said second supply flow restricting means opening upon change of the control signal thereto in said one direction.

11. Apparatus as in claim 10 wherein said control means are pressure responsive controllers, said first mentioned control means providing a signal inversely proportioned to the inlet pressure to said engine, said last mentioned control means providing a signal directly proportioned to the inlet pressure to said fuel system, and said means for preferential selection between said signals for adjustment of said bypass flow restricting means comprising a low-select relay.

12. A system for utilizing a pressurized fuel gas output from a process operation, comprising an expansion engine, means for supplying such pressurized gas to the inlet of said expansion engine, means for providing an auxiliary gas supply to said inlet, adjustable flow restricting means in said auxiliary supply, bypass conduit means connected between the inlet and the outlet of said engine, adjustable flow restricting means in said bypass conduit means, control means for adjusting said auxiliary flow restricting means and said bypass flow restricting means for providing a regulated gas supply to the inlet of said engine, a fuel gas system connected to the gas outlet from said engine, diversion conduit means connected to said outlet, adjustable flow restricting means in said diversion conduit means, and further control means for adjusting said diversion flow restricting means and said bypass flow restricting means to provide a regulated gas supply to said fuel gas system, and means for rendering a signal from either of said control means for opening of said bypass flow restricting means operative in preference to another signal from the other of said control means, whereby said main gas supply is continuously utilized and a regulated supply is provided for said engine and for said fuel gas system.

13. A method for utilizing a predetermined first gas supply in two systems in series, comprising providing a second gas supply to the first of said systems, providing for the regulated bypass of gas from the inlet of the first of said systems to the inlet of the second of said systems, varying the supply of gas from said second supply to said first system and said bypass to maintain a regulated supply of such gas to said first system in accordance with the demands of said first system, varying the flow of gas through said bypass in accordance with the greater flow demand as between utilizing all of the gas from said first supply and maintaining a regulated supply to said second system in accordance with the demands of said second system, providing for diversion of gas between said first and second systems, and varying the volume of gas diverted from passage to said second system to accommodate all of said gas from said first supply while maintaining such regulated supply to said second system.

14. A method of utilizing a predetermined pressurized gas supply in two independently regulated systems in series, comprising providing a regulated auxiliary gas supply to the first of said systems, providing for the regulated bypass of gas from the inlet of the first of said systems to the inlet of the second of said systems, providing for regulated diversion of gas from the inlet of said second systems, regulating the quantity of gas admitted from said auxiliary supply to the inlet of said first system in accordance with the pressure at said inlet, regulating the quantity of gas being diverted from said second system in accordance with the inlet pressure to said second system, and regulating the quantity of gas being admitted through such bypass in accordance with the highest bypass flow requirement between providing the required minimum inlet pressure to said second system and accommodating the entire volume of said predetermined supply while limiting the inlet pressure to said first system to a predetermined maximum.

15. A method as in claim 14 comprising providing a first signal proportional to the inlet pressure to said first system, providing a second signal proportional to the inlet pressure to said second system, one of said signals being inversely proportional to the respective pressure value, and selecting between said signals in accordance with their relative magnitude for regulation of said bypass flow.

16. A method as in claim 15 utilizing a pressurized fuel gas output from a process operation and wherein said first system is an expansion engine and said second system is a fuel gas consuming system, said process providing an output of presurized gas slightly greater than the normal requirements of said engine.

References Cited

UNITED STATES PATENTS

| | | | |
|---|---|---|---|
| 3,161,203 | 12/1964 | Hathorn | 137—91X |
| 3,180,088 | 4/1965 | Swain | 415—28X |
| 3,219,046 | 11/1965 | Waugh | 137—8 |
| 3,332,856 | 7/1967 | Hart | 137—92X |
| 3,424,370 | 1/1969 | Law | 415—1 |
| 3,438,220 | 4/1969 | Collins | 137—4X |

CLARENCE R. GORDON, Primary Examiner

U.S. Cl. X.R.

60—64; 137—14, 115, 117; 415—28, 144